United States Patent
Trim et al.

(10) Patent No.: US 11,783,221 B2
(45) Date of Patent: Oct. 10, 2023

(54) DATA EXPOSURE FOR TRANSPARENCY IN ARTIFICIAL INTELLIGENCE

(71) Applicant: International Business Machines Corporation, Armonk, NY (US)

(72) Inventors: Craig M. Trim, Ventura, CA (US); Michael Bender, Rye Brook, NY (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 16/428,250

(22) Filed: May 31, 2019

(65) Prior Publication Data

US 2020/0380405 A1 Dec. 3, 2020

(51) Int. Cl.
*G06N 20/00* (2019.01)
*G06F 16/27* (2019.01)
*G06N 5/045* (2023.01)

(52) U.S. Cl.
CPC ............. *G06N 20/00* (2019.01); *G06F 16/27* (2019.01); *G06N 5/045* (2013.01)

(58) Field of Classification Search
CPC ........ G06N 5/045; G06N 7/005; G06N 20/10; G06N 3/08; G06N 5/003; G06N 5/02; G06N 20/20; G06N 3/0427
See application file for complete search history.

(56) References Cited

U.S. PATENT DOCUMENTS

| | | | |
|---|---|---|---|
| 8,768,782 B1 * | 7/2014 | Myslinski | G06F 16/284 705/26.1 |
| 10,007,719 B2 * | 6/2018 | Horvitz | G06F 16/332 |

(Continued)

FOREIGN PATENT DOCUMENTS

| | | |
|---|---|---|
| CN | 106485230 A | 3/2017 |
| CN | 107145846 A | 9/2017 |

OTHER PUBLICATIONS

Burt, C., "Google introduces machine learning analysis tool to combat AI bias." Retrieved from Internet URL: <https://www.biometricupdate.com/201809/googleintroduces-machine-learning-analysis-tool-to-combat-ai-bias>, Sep. 13, 2018, 1 pg.

(Continued)

*Primary Examiner* — Mohamed A. Wasel
*Assistant Examiner* — Tesfu N Mekonen
(74) *Attorney, Agent, or Firm* — Michael A. Petrocelli, Esq.; Rachel L. Pearlman, Esq.; Heslin Rothenberg Farley & Mesiti P.C (57) ABSTRACT

A method, computer program product, and a system where a processor(s) obtains data from one or more sources, wherein a portion of the one or more sources comprise training data for a first artificial intelligence decision-making system. The processor(s) ingest data from each source into a corpus and ingest metadata corresponding to the data, into a volume accessible to a second artificial intelligence decision-making system. The processor(s) search public sources and obtain information describing quality and non-objective influence of the data from each source. The processor(s) provide as inputs to the second artificial intelligence decision-making system, the information and the metadata, to classify the quality and the non-objective influence of each source. The processor(s) obtains outputs comprising, for each source, a first rating classifying the quality of the source of the one or more sources. The processor(s) load the outputs into a blockchain, obtain rules, and designate, via the blockchain, based on the rules, the portion.

19 Claims, 6 Drawing Sheets

(56) References Cited

U.S. PATENT DOCUMENTS

| | | | |
|---|---|---|---|
| 2017/0099200 A1 | 4/2017 | Ellenbogen et al. | |
| 2017/0330058 A1 | 11/2017 | Silberman et al. | |
| 2018/0322402 A1 | 11/2018 | Kulkarni et al. | |
| 2018/0357557 A1 | 12/2018 | Williams et al. | |
| 2019/0082224 A1* | 3/2019 | Bradley | G06Q 30/0282 |
| 2020/0372067 A1* | 11/2020 | Otero | G06F 16/48 |
| 2020/0380049 A1* | 12/2020 | Pelleg | G06F 16/951 |
| 2020/0380398 A1* | 12/2020 | Weider | G06F 16/285 |
| 2021/0019339 A1* | 1/2021 | Ghulati | G06Q 50/00 |
| 2021/0117417 A1* | 4/2021 | Hendrickson | G06F 16/2465 |

OTHER PUBLICATIONS

Editorial Team, "4 Sources of Machine Learning Bias & How to Mitigate the Impact on AI Systems". Retrieved on Feb. 19, 2019 from Internet URL: <https://insidebigdata.com/2018/08/20/machine-learning-bias-ai-systems/>, Aug. 20, 2018, 3 pgs.

Anonymous, "System and method to detect most unbiased model version". IP.com No. IPCOM000256871D. Jan. 7, 2019, 4 pgs.

Susarla, A., "How Artificial Intelligence can detect—and create—fake news". Retrieved from Internet URL: <http://theconversation.com/how-artificial-intelligence-candetect-and-create-fake-news-95404>, May 3, 2018, 3 pgs.

Knight, Will. "Forget Killer Robots—Bias is the Real AI Danger". Retrieved on May 31, 2019 from Internet URL: <https://www.technologyreview.com/s/608986/forget-killer-robotsbias-is-the-real-ai-danger/>, Oct. 3, 2017, 9 pgs.

Devlin, H., "AI programs exhibit racial and gender biases, research reveals". Retrieved on May 31, 2019 from Internet URL: <https://www.theguardian.com/technology/2017/apr/13/ai-programs-exhibit-racist-and-sexist-biases-research-reveals>, Apr. 13, 2017, 3 pgs.

Folick, O ., "How AI Can Stop Unconscious Bias in Recruiting" Retrieved on May 31, 2019 from Internet URL: <https://deal.com/unconscious-bias/>, Apr. 2, 2019, 6 pgs.

"Banker to Banker", CenterState—Correspondent Division— Retrieved on May 31, 2019 from Internet URL: <https://csbcorrespondent.com/blog/bias-your-loan-approval-process-partidoesa>, 2019, 6 pgs.

* cited by examiner

DATA EXPOSURE FOR TRANSPARENCY IN ARTIFICIAL INTELLIGENCE

BACKGROUND

Increasingly, Artificial Intelligence (AI) systems are being implemented in many computing environments in order to analyze data and surroundings, solve or anticipate problems, and learn or self-teach to adapt to a variety of tasks. A few applications of AI include knowledge reasoning, planning, machine learning, natural language processing, and computer vision, robotics, and artificial general intelligence. One or the areas in which AI are being used more and more frequently is in decision-making. AI decision-making systems are capable of different approaches to decision-making and utilize a wide variety of reasoning, including but not limited to, case-based reasoning, rule-based systems, artificial neural networks, fuzzy models, genetic algorithms, cellular automata, multi-agent systems, swarm intelligence, reinforcement learning, and hybrid systems. One area in which AI is relied upon to make decisions is in investment. At least one major financial institution utilizes AI for natural language processing, to read text such as news, broker reports, and social media feeds, and to make investment decisions based on the analysis of this underlying data.

SUMMARY

Shortcomings of the prior art are overcome and additional advantages are provided through the provision of a method for providing transparency in training data for artificial intelligence system. The method includes, for instance: obtaining, by one or more processors, data from one or more sources, wherein a portion of the one or more sources comprise training data for a first artificial intelligence decision-making system; ingesting, by the one or more processors, data from each source of the one or more sources into a corpus; ingesting, by the one or more processors, metadata corresponding to the data, into a volume accessible to a second artificial intelligence decision-making system; searching, by the one or more processors, one or more publicly available sources and obtaining, based on the searching, information describing quality and non-objective influence of the data from each source of the one or more sources; providing, by the one or more processors, as inputs to the second artificial intelligence decision-making system, the information and the metadata, to classify the quality and the non-objective influence of each source of the one or more sources; obtaining, by the one or more processors, outputs from the second artificial intelligence decision-making system comprising, for each source of the one or more sources, a first rating classifying the quality of the source of the one or more sources; loading, by the one or more processors, the outputs into a blockchain; obtaining, by the one or more processors, rules, wherein the rules define one or more values for the first rating; and designating, by the one or more processors, via the blockchain, based on the rules, the portion of the one or more sources, wherein the portion comprises sources of the one or more sources classified with the one or more values for the first rating.

Shortcomings of the prior art are overcome and additional advantages are provided through the provision of a computer program product for providing transparency for training data for artificial intelligence systems. The computer program product comprises a storage medium readable by a processing circuit and storing instructions for execution by the processing circuit for performing a method. The method includes, for instance: obtaining, by the one or more processors, data from one or more sources, wherein a portion of the one or more sources comprise training data for a first artificial intelligence decision-making system; ingesting, by the one or more processors, data from each source of the one or more sources into a corpus; ingesting, by the one or more processors, metadata corresponding to the data, into a volume accessible to a second artificial intelligence decision-making system; searching, by the one or more processors, one or more publicly available sources and obtaining, based on the searching, information describing quality and non-objective influence of the data from each source of the one or more sources; providing, by the one or more processors, as inputs to the second artificial intelligence decision-making system, the information and the metadata, to classify the quality and the non-objective influence of each source of the one or more sources; obtaining, by the one or more processors, outputs from the second artificial intelligence decision-making system comprising, for each source of the one or more sources, a first rating classifying the quality of the source of the one or more sources; loading, by the one or more processors, the outputs into a blockchain; obtaining, by the one or more processors, rules, wherein the rules define one or more values for the first rating; and designating, by the one or more processors, via the blockchain, based on the rules, the portion of the one or more sources, wherein the portion comprises sources of the one or more sources classified with the one or more values for the first rating.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
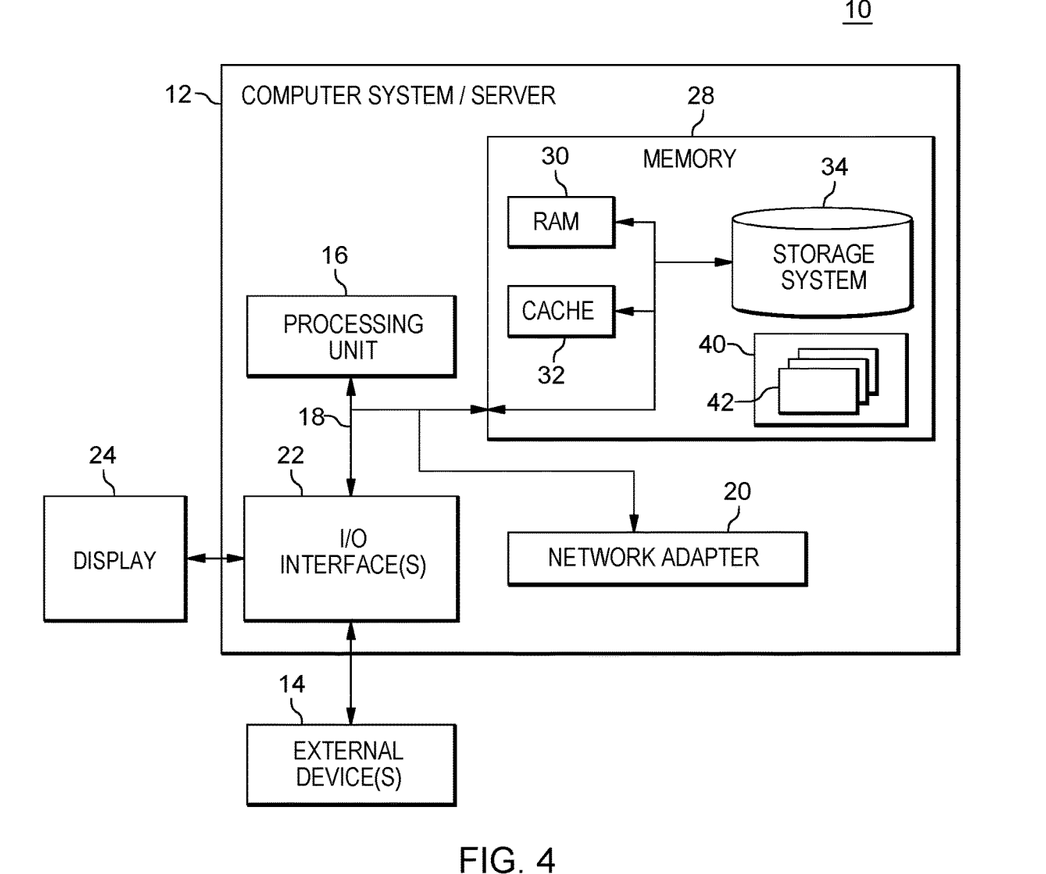
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Because of its increased usage across many industries, AI is sometimes promoted as a future of decision tools. However, the decision processing and the outcome provided by AI is often tied to the underlying data used to train the AI. The data utilized in the training can greatly influence the outcome, by introducing non-objective influence into the outcome because of non-objective influence in this underlying data. Data utilized to train AI decision tools can inadvertently include data that includes non-objective influences. Bias is only one example of a non-objective influence. For example, data can lack objectivity because it is geographically limited. For example, an AI decision tool that is trained to advise an individual on when to put snow tires on a car would be most useful if it were trained using data that takes into account where the car is located as weather patterns, as well as snow removal practices, greatly vary locally. Thus, if an individual is relying on a tool when situated in upstate New York and the training data is from Juno, Ak., the results could be problematic because of the non-objective influence in this underlying data. Extending this example, although historical weather data and snow removal data from Juno, Ak. could potentially inform snow tire-related decisions in upstate New York, this data would arguably be less valuable than data that is more targeted to the region in which the question is being posed. Thus, if included as training data, it would be desirable to give less weight to the Juno, Ak. data then to the data from upstate New York. Thus, as will be explained below, in embodiments of the present invention, the program code provides transparency to non-objective influences in training data such that the non-objective influences of the training data can be appropriately weighted when AI is trained such that the results will not be adversely affected by the non-objective influences.

In the example above, non-objective influence was introduced into decision making through data because the data was sourced from a geographic area that introduced non-objective influences. However, in some cases, non-objective influences are introduced into AI systems because the training data lacks diversity, one such example can be experienced when utilizing talent recruitment systems, which have been used to identify candidates for technology job. It was noticed by recruiters that the AI was identifying candidates with similar backgrounds, rather than providing a more diverse group of candidates. Further research revealed that the underlying data used to train the algorithms was not representative of a more diverse population, thus, the AI has identified patterns and built a classifier based on these patterns, when the patterns were only indicators of potential candidacy in the field for a certain group. In fact, when the underlying training data was expanded, many of the strong predictive factors that had helped identify candidates were no longer strong predictors within the model.

Non-objective influences in training data that can impact decision-making in AI systems go beyond the idea of bias. However, bias is one example of a non-objective influence that can prove problematic in a training set and the transparency provided by the program code in embodiments of the present invention addresses this type of non-objective influence as well. One example of training data potentially informing the decision-making of AI where bias can play a role is the utilization of media stories as training data. In this case, because various media sources can inject viewpoints into their coverage of the same events, the results provided by AI trained systems using one source could significantly differ from the results provided by AI trained system with another source.

Because the training data utilized by AI decision systems contributes to the decisions (i.e., outputs) of the system, it is worthwhile to comprehend any potential non-objective influences in training sets and to achieve non-objective influence transparency regarding this training data before relying on a decision provided by the AI.

Embodiments of the present invention include a computer-implemented method, a computer program product, and a computer system for building transparency and avoiding predispositions based on training tools in AI based systems. In embodiments of the present invention, the program code determines the non-objective influences of individual data sources and uses this information to curate training data for utilization in training an AI system. In embodiments of the present invention, program code executing on at least one processing device stores source data repositories and volumes for use in training an AI system, but when delineating a knowledge base (relevant training data) for a given AI system, the program code narrows the available data in the repositories and volumes to the knowledge base by determining a predisposition and/or perspective of the source of the data in the repositories and volumes and selecting a portion of the data for the knowledge base based on determining that the predisposition and/or perspective of the source(s) for the selected data render the data usable for training the AI system. The AI decision tree of the AI system utilizes the data in the resultant knowledge base. As understood by one of skill in the art, an AI decision tree is a representation for classifying examples. Decision tree learning is an example of supervised classification learning in which, generally, the arcs coming from a node labeled with a feature are labeled with each of the possible values of the feature.

In embodiments of the present invention, the program code generates an appropriate knowledge base of training data by exposing the non-objective influence of the sources of the data which could potentially be utilized as training data for an AI system. In generating the knowledge base (i.e., a training set of data), from the repositories and volumes, to be used by the AI decision tree, the program code: 1) generates a corpus (e.g., a body of text/writing) comprised of data for each independent source of the data stored in the repositories and volumes; 2) determines a predisposition and/or perspective for each corpus, based on the metadata of the source, including but not limited to a regional perspective, a national perspective, a science community perspective, a non-expert perspective, an expert perspective, an industry, advocacy associated with the perspective, groups associated with the perspective, etc.; 3) rates the predispositions and/or perspectives of each of the corpuses; and 4) includes or excludes each corpus from the knowledge base, based on the ratings of the predisposition and/or perspective of the corpus. In some embodiments of the present invention, the program code defines quality of data used for a given corpus and rates the given corpus based on a definition of quality of the data. In this manner, the program code can exclude subsets of available training data from the data provided by different sources from the knowledge base used by an AI decision tree, as it is built from the corpus. Embodiments of the present invention enable the visualization and comprehension of non-objective influences in the source data that impact the results of AI systems, and thus, results provided to consumers of these systems.

Embodiments of the present invention are inextricably tied to computing and provide a practical solution utilizing computing resources. For example, embodiments of the present invention are inextricably tied to computing at least because the program code in these embodiments utilizes the digital communication channels and the real-time communications, enabled in a distributed computing environment, and performs a cognitive analysis (accessing resources available based on the connectivity of the computing system) to facilitate data collection as well as data analysis, in order to determine a predisposition/perspective/non-objective influence(s) for corpuses of data from varying sources. Additionally, embodiments of the present invention relate to the field of AI and specifically enabling transparency in decision-making by AI based on cognitively analyzing data to be utilized to train the AI and selecting data based on the analysis.

Embodiments of the present invention provide a practical application in their utilization of computing systems. The utilization of training data that is free from non-objective influences (or with identified non-objective influences) for decision-making AI is a specific issue to which embodiments of the present invention provide a practical approach to this issue. As explained below, program code partitions possible training data in order to create a training data set for use by an AI system for which the non-objective influence is transparent, based on analysis prior to the partitioning. Based on this analysis of source material, the program code can generate the predisposition and/or perspective for each corpus and thus, provide, in a practical manner, a non-objective influence transparent knowledge base from which to train an AI decision tree.

Some embodiments of the present invention provide significant improvements in the area of AI systems. As discussed above, existing AI decision systems utilize decision trees to generate outputs (decisions) based on machine learning from training data and if the training data includes any inherent non-objective influence, the output can integrate that non-objective influence. Embodiments of the present invention provide a significant improvement by providing transparency to any non-objective influence in the training data to allow intelligent selection of the training data for a given AI system. In embodiments of the present invention, the AI system utilizes decision tree learning, which is an example of supervised classification, a type of supervised machine learning. In supervised learning, a full set of labeled data is available to train machine learning algorithms utilized by the program code in the analysis. Program code in embodiments of the present invention curates this data set such that the AI system being trained based on the data set will produce a trusted (objective) result and/or a result with known or purposely selected non-objective influence. In supervised learning, each example is a pair consisting of an input object (typically a vector) and a desired output value (also called the supervisory signal). A supervised learning algorithm analyzes training data and produces an inferred function, which can be used for mapping new examples. An optimal scenario will allow for the algorithm to correctly determine the class labels for unseen instances. This requires the learning algorithm to generalize from training data to unseen situations in a "reasonable" way. Thus, based on patterns in the training data obtained by the program code of the AI system, the program code of the AI system can classify the new elements. Thus, the set of data utilized to train the algorithm is determinative of the set of possible outcomes and hence, curating the data in the training set is a significant improvement over existing AI system training approaches.

Figure 1:
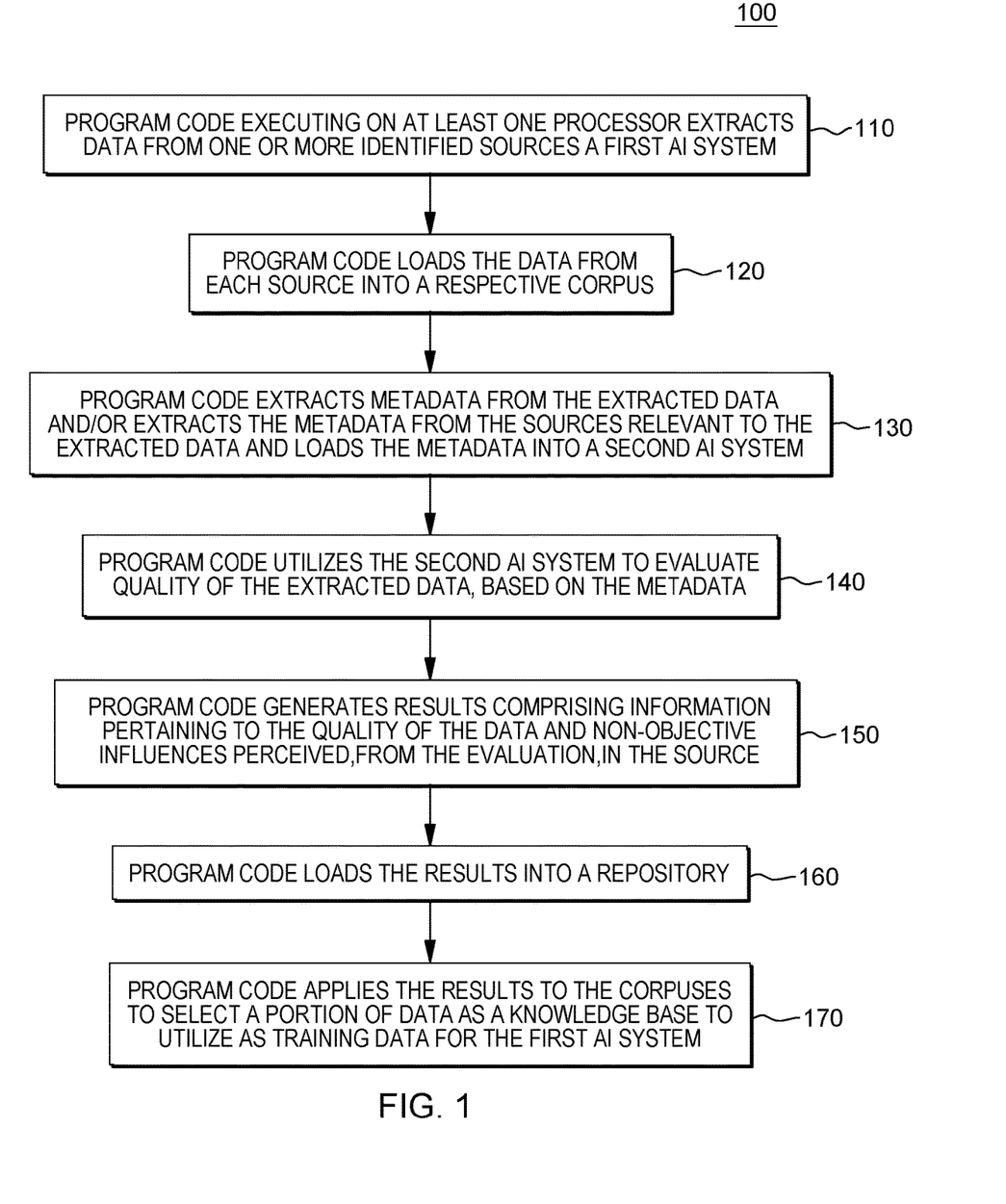
FIG. 1 is a workflow that illustrates certain aspects of some embodiments of the present invention.

FIG. 1 is a workflow 100 that illustrates certain aspects of some embodiments of the present invention. As illustrated in FIG. 1, to expose non-objective influences used in the data used to train an AI system, program code in embodiments of the present invention can: 1) rank the non-objective influences of the source data and how much agreement there is on the quality of that source; and 2) enable an AI system to remove data from the corpus used in the decision tree that is deemed by a consumer or automatic analysis process to have been produced with a non-objective influence.

In some embodiments of the present invention, program code executing on at least one processor extracts data from one or more identified sources (110). The program code loads the data from each source into a respective corpus (120). In some embodiments of the present invention, the data can be loaded into a common corpus. Concurrent with loading the data into from each source into the respective corpus, the program code extracts metadata from the extracted data and/or extracts the metadata from the sources relevant to the extracted data and loads the metadata into a second AI system (130). The program code utilizes the second AI system to evaluate quality of the extracted data, based on the metadata (140). For example, utilizing the metadata, the second AI system can classify the respective data source by perspectives, including but not regional perspective, a national perspective, a science community perspective, a non-expert perspective, an expert perspective, an industry, advocacy associated with the perspective, groups associated with the perspective, etc.

In some embodiments of the present invention, the program code determines the non-objective influences based on crowd-sourcing of the publicly available sources. For example, the program code can query to locate social media feeds, news items, and government announcements, the program code can analyze this data (e.g., utilizing natural language processing), to understand the contexts and determine non-objective influences. For example, if the majority of social media posts about a given source are positive if the social media profile of the speaker has a certain political affiliation, but the opposite is not true, the program code can predict a political non-objective influence for the source. By analyzing unstructured data from these sources, the program code can identify garner additional insight regarding the source perspective(s).

Returning to FIG. 1, based on the review, the program code generates results comprising information pertaining to the quality of the data and non-objective influences perceived, from the evaluation, in the source (150). Thus, in some embodiments of the present invention, the program code rates the predispositions and/or perspectives of each of the corpuses.

In some embodiments of the present invention, the program code ranks the non-objective influences of the source data and how much agreement there is on the quality of that source. The program code loads the results into a repository (160). In some embodiments of the present invention, the repository is a blockchain and based on the ingested data is logged in the blockchain. As understood by one of skill in the art, a blockchain is a growing list of records (i.e., blocks), called blocks, which are linked using cryptography. Each block contains a cryptographic hash of the previous block, a timestamp, and transaction data. The program code applies the results to the corpuses to select a portion of data as a knowledge base to utilize as training data for the first AI system (170). In some embodiments of the present invention, based on selecting the portion of the data for the knowledge base, the program code utilizes the application of the results to track the composition of the training data in the knowledge base and when the AI system was trained with the information in the knowledge base. In some embodiments of the present invention, the program code stores the data in data repositories and volumes that are ingested into blockchains, which persist with the corpuses and AI system.

The logic/process behind the exclusion of certain data (i.e., data from certain sources) from the knowledge base can vary. In some embodiments of the present invention, the program code automatically excludes various data based on predefined standards governing the type of results to be utilized as training data. In some embodiments of the present invention, a user can actively exclude data from a knowledge base. The program code generates a user interface accessible through a personal computing device and provides the results for each source to the user. Through this interface, the program code enables the user to interact with the data from the system, or directly to the blockchain, to exclude data that the user perceives as being influenced by non-objective elements. Because non-objective influence in data sources is exposed and the program code excludes results that would provide the non-objective influence, the user of the AI system can trust a final answer provided by the AI system.

In some embodiments of the present invention, the second AI system, which determines the quality of the data and identifies non-objective influences can utilize an existing cognitive agent in making these determinations. One such cognitive agent that can be utilized in embodiments of the present invention is IBM Watson®. IBM Watson® is a registered trademark of International Business Machines Corporation, Armonk, N.Y., US. For example, in some embodiments of the present invention, the program code interfaces with the application programming interfaces (APIs) that are part of a known cognitive agent, such as the IBM Watson® Application Program Interface (API), a product of International Business Machines Corporation, to identify perform determine the predisposition and/or perspective for each corpus. For example, three APIs that can be utilized in embodiments of the present invention include, but are not limited to IBM Watson® Natural Language Classifier (NLC), IBM Watson® Natural Language Understanding, and IBM Watson® Tone Analyzer. As understood by one of skill in the art, the IBM Watson® APIs are only provided to offer an example of possible APIs that can be integrated into embodiments of the present invention and to illustrate the functionality of the program code in embodiments of the present invention, whether through integration of an existing cognitive engine or not. In some embodiments of the present invention, in order to determine a predisposition and/or perspective for a given corpus (i.e., determine the quality and non-objective influences of a data source), the program code can analyze the metadata from a source using one or more of the following approaches: 1) categorizing metadata, including textual data, from the source with custom labels to extract insights; 2) classifying metadata, including textual data, from the source into custom categories; 3) extracting entities, relationships, keywords, and/or semantic roles from within the metadata, including textual data; and 4) analyzing emotions and tones in the metadata to predict the sentiments behind the data, including textual data, (e.g., happy, sad, confident, etc.). Based on this analysis of the metadata from the sources, the program code can generate the predisposition and/or perspective for each corpus and thus, provide, in a practical manner, a non-objective influence transparent knowledge base from which to train an AI decision tree.

The second AI system can utilize a machine learning algorithm, which can be understood as a classifier, as it classifies records (i.e., sources) into non-objective influence and/or quality groups, based on relationships between data elements in the metadata from the sources. In some embodiments of the present invention, the program code can utilize the frequency of occurrences of features in mutual information to identify and filter out false positives. The program code utilizes the classifier to create a boundary between data of a first quality condition and the general base quality of data in the system. As the classifier of the second AI system is utilized, its accuracy can increase as testing the classifier tunes its accuracy. In an embodiment of the present invention, the program code feeds a pre-existing feature set describing features of metadata (e.g., research practices that created the data from the source, the method of evaluation and preparation of the data before publication at the source, the source type (e.g., well known news source, blog, etc.), characteristics of subscribers to the source). The program code the classifier to classify records (sources) based on the presence or absence of a given condition, which is known before the tuning. The presence or absence of the condition is not noted explicitly in the records of the data set. When classifying a source as providing data of a given condition or of a certain non-objective influence (based on the metadata), utilizing the classifier, the program code can indicate a probability of a given condition with a rating on a scale, for example, between 0 and 1, where 1 would indicate a definitive presence. The classifications need not be binary and can also be values in an established scale. The machine learning algorithm utilized by the second AI system can be one or more known algorithms, including, but not limited to a Naïve Bayes Classifier Algorithm, a K Means Clustering Algorithm, a Support Vector Machine Algorithm, an Apriori Algorithm, Linear Regression, Logistic Regression, an Artificial Neural Networks, Random Forests, Decision Trees, and Nearest Neighbours.

In some embodiments of the present invention, the second AI system can utilize a neural network (e.g., Artificial Neural Networks) to predict/determine the non-objective influence and data quality of data from a given source, based on the inputs (e.g., metadata) provided. Utilizing the neural network, the program code can predict subsequent data, enabling the rapid determination of a quality and non-objective influence ranking for a given source. The program code obtains (or derives) the initial attributes from the metadata to generate an array of values (possible attributes) to input into input neurons of the neural network. Responsive to these inputs, the output neurons of the neural network produce an array which includes the identified attributes as well as the predicted attributes. The neural network can also be utilized to process the metadata of multiple sources simultaneously, and in processing these data, the program code can generate and predict relationships between sources for utilization in generating a data structure of classifications for the sources (e.g., quality, non-objective influence).

As discussed above, in some embodiments of the present invention, the program code utilizes a neural network to analyze user data (e.g., source metadata) and generate the data structures for use in classifying the sources. Neural networks are a biologically-inspired programming paradigm which enable a computer to learn from observational data, in this case, the metadata ingested from the source. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns and attributes in data. Because of the speed and efficiency of neural networks, especially when parsing multiple complex data sets, neural networks and deep learning both provide solutions to ingesting and organizing data from diverse sources. In fact, neural networks can be used to solve many problems where data inputs are varied and can include natural language processing, which is relevant to embodiments of the present invention when determining the non-objective influence and data quality.

Some embodiments of the present invention may utilize a neural network to predict additional non-objective influences of a data source, for inclusion in the data structure, based on the inputs provided. Utilizing the neural network, the program code can predict subsequent data. The program code obtains (or derives) the initial attributes from the source metadata to generate an array of values (possible attributes) to input into input neurons of the neural network. Responsive to these inputs, the output neurons of the neural network produce an array that includes the identified attributes as well as the predicted attributes (as related to data quality and non-objective influence).

In some embodiments of the present invention, a neuromorphic processor or trained neuromorphic chip can be incorporated into the computing resources executing the program code. One example of a trained neuromorphic chip that can be utilized in an embodiment of the present invention is the IBM® TrueNorth chip, produced by International Business Machines Corporation.

Figure 2:
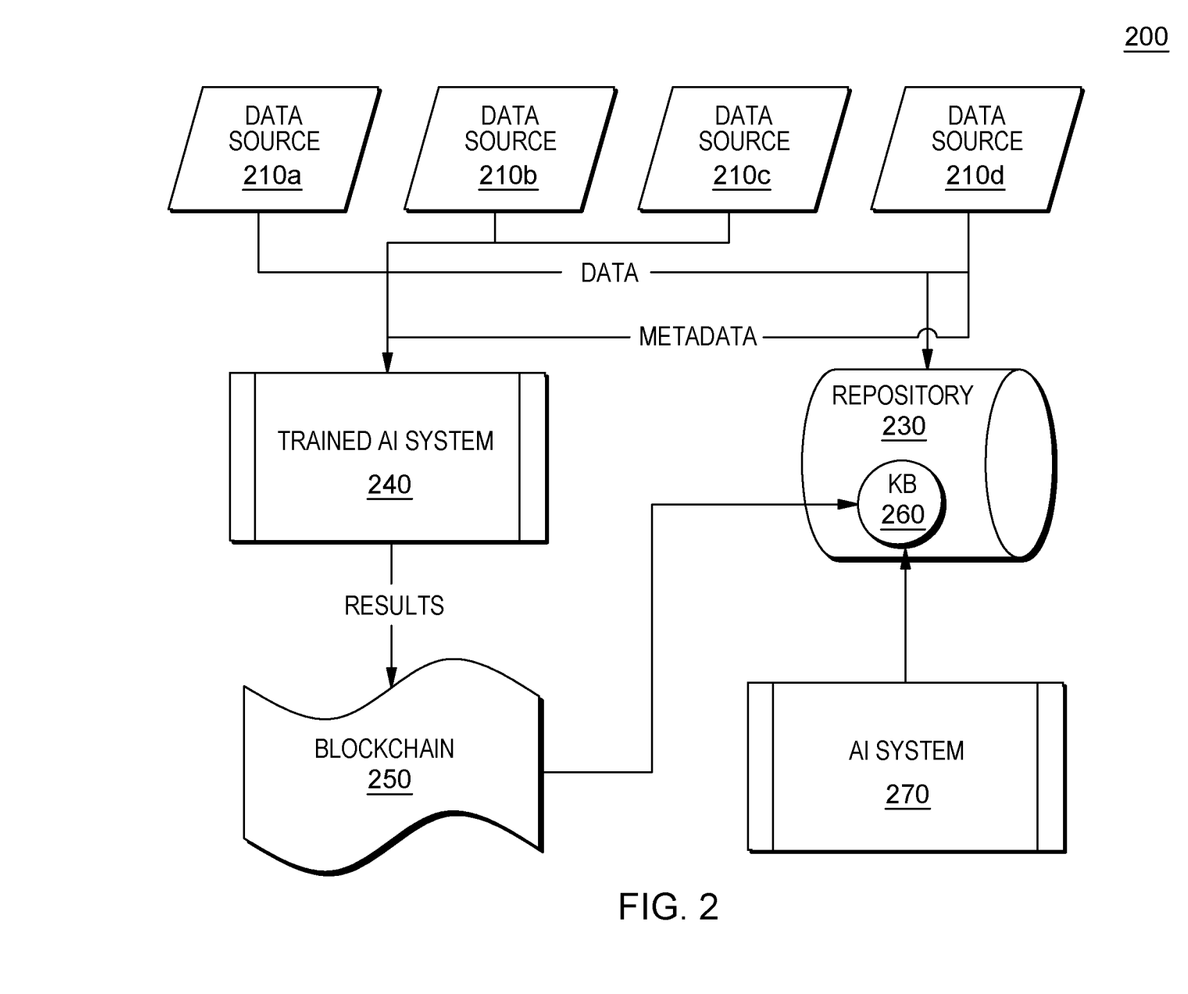
FIG. 2 illustrates various aspects of some embodiments of the present invention.

FIG. 2 illustrates various aspects of a computing environment 200 into which various aspects of the present invention are implemented. As illustrated in FIG. 2, program code executing on one or more processors obtains data from a variety of sources 210a-210d (this number of sources is utilized as an example and not to suggest any limitations), and loads the data for each source into a corpus in a repository 230. The program code concurrently with obtaining the data, extracts the metadata of the data and provides the metadata to a trained AI system 240. The trained AI system determines one or more of the data quality and/or non-objective influences of each source and stores these results in a blockchain 250. The program code utilizes the results in the blockchain 250 to include and/or exclude certain of the corpuses from the repository 230 in a knowledge base 260 for use in training an AI system 270. In some embodiments of the present invention, the program code provides the result to a user, via a user interface on a computing device 280, and inputs by the user trigger the selection of corpuses for the knowledge base 260 (i.e., training data for the AI system 270).

In some embodiments of the present invention, limiting a knowledge base for training a first AI system based on non-objective influence can be understood, in the context of these embodiments, as including three aspects performed by the program code: 1) obtaining potential data from designated sources for use in training the first AI system; 2) identifying perceived non-objective influences in sources of the data obtained; and 3) limiting the knowledge base (training data set) for the first AI system, based on the non-objective influences. These three aspects are illustrated in the workflow 300 of FIG. 3.

Figure 3:
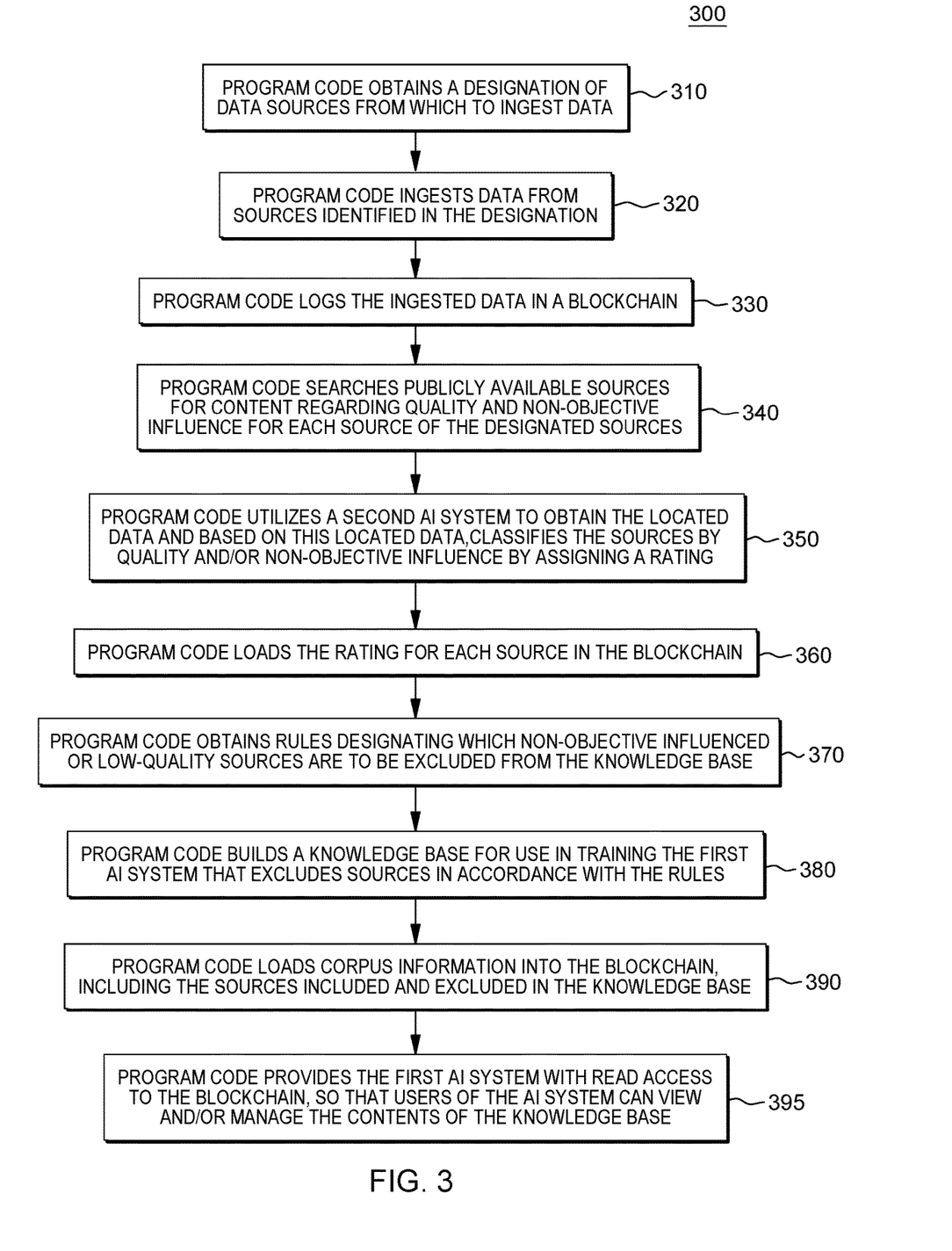
FIG. 3 is a workflow that illustrates certain aspects of some embodiments of the present invention.

Referring to FIG. 3, in some embodiments of the present invention, before a knowledge base can be built for the first AI system to utilize in its training, the program code utilizes another AI system, called the second AI system, to determine the non-objective influences of the data sources which could potentially supply the training data for the knowledge base. To do this, the program code obtains data from sources that the second AI system can cognitively analyze. The program code obtains a designation of data sources from which to ingest data (310). In some embodiments of the present invention, users designate these sources through an interface and the program code obtains this selection. Based on obtaining the designation, the program code ingests data from sources identified in the designation (320). In some embodiments of the present invention, data from each source is ingested into a separate corpus. In other embodiments of the present invention, the data from the designated sources share a single corpus, which is later updated to exclude data from certain sources. The program code logs the ingested data in a blockchain (330). The program code can store the volume of data from any source in the blockchain.

Once the data has been ingested (320) and logged in the blockchain (330), the program code identifies perceived non-objective influences in the data by determining non-objective influences of the designated sources. In some embodiments of the present invention, the program code searches publicly available sources (e.g., over the worldwide web) for articles, social media posts, blogs, etc., regarding the quality and non-objective influences for each source of the designated sources (340). As discussed above, the program code can utilize a cognitive agent to determine quality and non-objective influences from the unstructured data located through the search. Thus, the program code can determine the non-objective influences using machine learning about the quality and/or non-objective influences in the training data. In the case of media sites, the program code can locate and utilize a media site aggregator from a watchdog organization that ranks the non-objective influences of the sources and utilize these rankings. In some embodiments of the present invention, the program code utilizes a second AI system to obtain the located data and based on this located data, classifies the sources by quality and/or non-objective influences by assigning a rating (350). The program code can assign a first rating for quality and a second rating for non-objective influences. In some embodiments of the present invention, the ratings are selected from a scale of possible ratings, which are finite and predefined. For example, as discussed above, bias is only one example of a non-objective influence and a given source could be classified, by non-objective influences, as right-leaning, center, or left-leaning. This safe source could be classified by quality as high, medium, or low. The program code loads the rating for each source in the blockchain (360). The program code can persist the source and non-objective influences information in the blockchain.

Once the data has been retained (310) sources have been rated (350), the program code can provide the opportunity to a user to isolate data from certain sources for use in training a decision system, the first AI system. The program code can obtain selections of ratings from a user and utilize the blockchain to limit the corpuses in the knowledge base. In some embodiments of the present invention, the program code obtains rules designating which source influences by non-objective influence or low-quality sources are to be excluded from the knowledge base (370). In some embodiments of the present invention, the program code obtains these rules from an administrative user, view an interface in a personal computing device. The user can designate specific rating values and/or groups of rating values to exclude from the knowledge base and based on these designation, the program code can exclude data from specific sources that comport with these rules. The program code builds a knowledge base for use in training the first AI system that excludes sources in accordance with the rules (380). The program code loads corpus information into the blockchain, including the sources included and excluded in the knowledge base (390). The program code provides the first AI system with read access to the blockchain, so that users of the AI system can view and/or manage the contents of the knowledge base (395). Thus, the program code can expose the non-objective influence/quality information to end users and trainers of the AI system (e.g., through a user interface).

Embodiments of the present invention include a computer-implemented method, a computer program product, and a computer system, where program code executing on one or more processors obtains data from one or more sources, where a portion of the one or more sources comprise training data for a first artificial intelligence decision-making system. The program code ingests data from each source of the one or more sources into a corpus. The program code ingests metadata corresponding to the data, into a volume accessible to a second artificial intelligence decision-making system. The program code searches one or more publicly available sources and obtains, based on the searching, information describing quality and non-objective influence of the data from each source of the one or more sources. The program code provides as inputs to the second artificial intelligence decision-making system, the information and the metadata, to classify the quality and the non-objective influence of each source of the one or more sources. The program code obtains outputs from the second artificial intelligence decision-making system comprising, for each source of the one or more sources, a first rating classifying the quality of the source of the one or more sources. The program code loads the outputs into a blockchain. The program code obtains rules, where the rules define one or more values for the first rating. The program code designates, via the blockchain, based on the rules, the portion of the one or more sources, where the portion comprises sources of the one or more sources classified with the one or more values for the first rating.

In some embodiments of the present invention, the program code provides, as training data for the first artificial intelligence decision-making system, the portion.

In some embodiments of the present invention, outputs further comprise a second rating classifying the non-objective influence of each source of the one or more sources, the rules define one or more values for the second rating, and the portion comprises sources of the one or more sources classified with the one or more values for the second rating.

In some embodiments of the present invention, ingesting the metadata is concurrent with ingesting the data.

In some embodiments of the present invention, designating the portion comprises generating a knowledge base comprising the portion, where the knowledge base comprises the training data.

In some embodiments of the present invention, the program code obtains new rules, where the new rules define a second one or more values for the first rating, where the second one or more values for the first rating differ from the one or more values for the first rating. The program code re-designates, via the blockchain, based on the rules, the portion of the one or more sources, where the portion comprises sources of the one or more sources classified with the second one or more values for the first rating.

In some embodiments of the present invention, the information is selected from the group consisting of: social media feeds, news items, and government announcements.

In some embodiments of the present invention, the program code classifying the quality and the non-objective influence of each source of the one or more sources comprises the program code performing natural language processing on the information.

In some embodiments of the present invention, the program code ingesting the data comprises logging the data in the blockchain.

In some embodiments of the present invention, the program code logs identifiers for sources comprising the portion in the blockchain.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, program code executing the first and second AI systems, the blockchain, and the repositories and volumes that house the data can each be understood as a cloud computing node 10 (FIG. 4) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
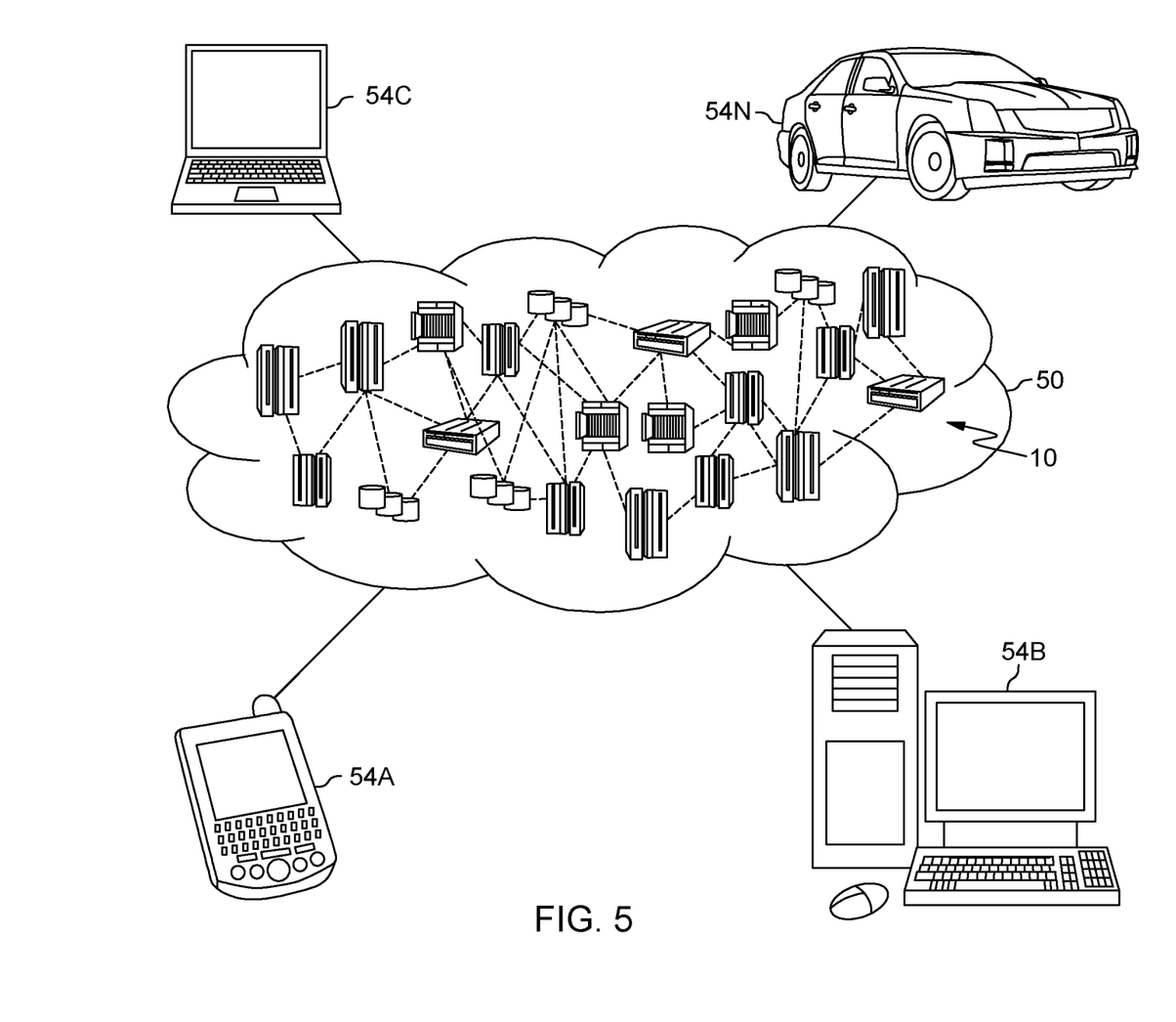
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
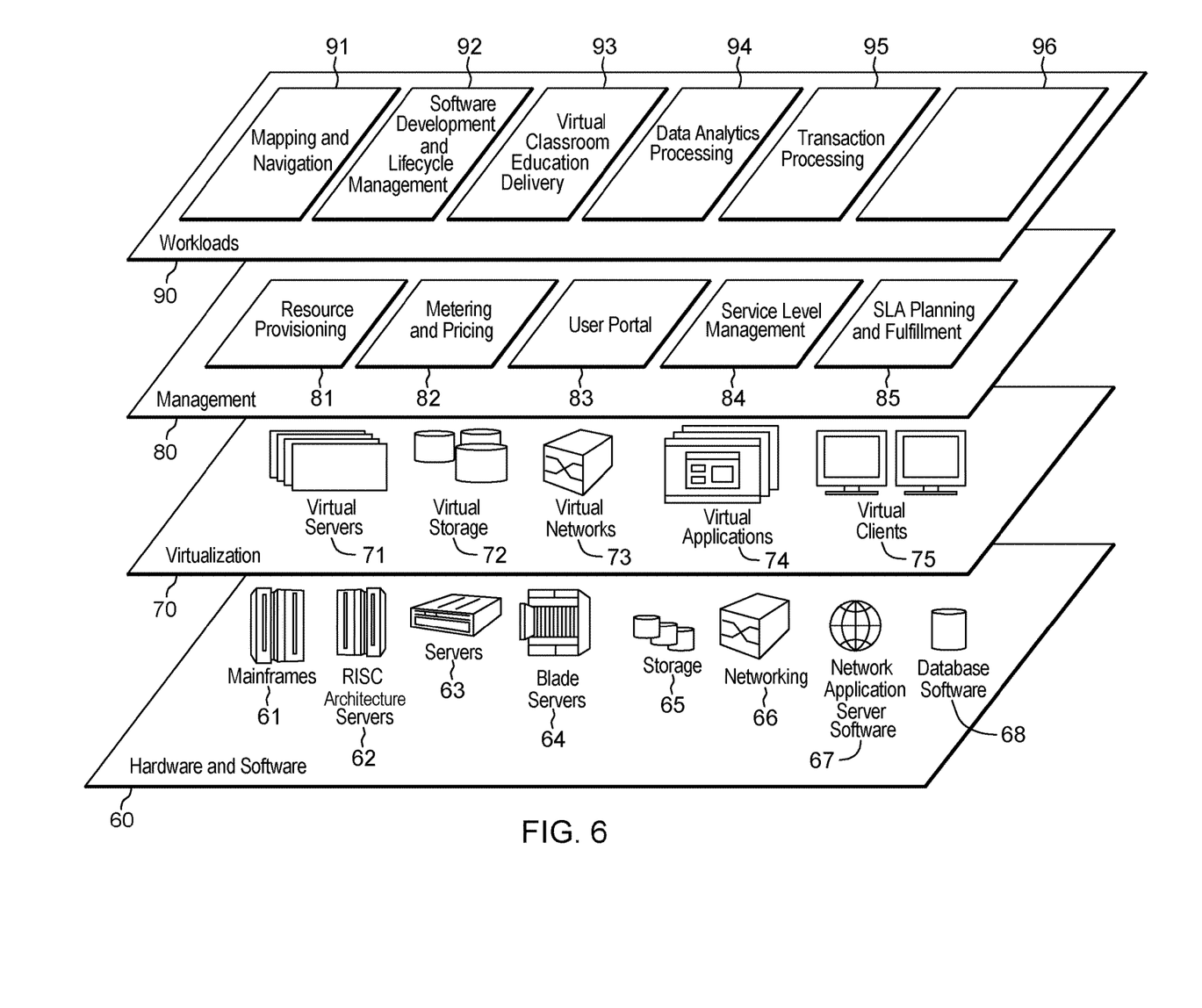
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing transparency in and selecting of training data 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
obtaining, by one or more processors, data from one or more sources, wherein a portion of the one or more sources comprises training data for a first artificial intelligence decision-making system;
extracting, by the one or more processors, metadata corresponding to the data from the data;
ingesting, by the one or more processors, data from each source of the one or more sources into a corpus;
ingesting, by the one or more processors, the metadata corresponding to the data, into a volume accessible to a second artificial intelligence decision-making system, wherein the second artificial intelligence decision-making system identifies from the one or more sources the portion of the one or more sources to utilize as the training data to train the first artificial intelligence decision-making system, wherein the ingesting comprises:
identifying, by the one or more processors, initial attributes from the metadata;
generating, by the one or more processors, an array of initial values from the initial attributes;
providing, by the one or more processors, the array to a neural network; and
based on the providing, obtaining, by the one or more processors, from the neural network, as output, updated values comprising predicted attributes and the initial attributes;
searching, by the one or more processors, one or more publicly available sources and obtaining, based on the searching, information describing quality and non-objective influence of the data from each source of the one or more sources;
providing, by the one or more processors, as inputs to the second artificial intelligence decision-making system, the information and the updated values of the metadata, to classify the quality and the non-objective influence of each source of the one or more sources;
obtaining, by the one or more processors, outputs from the second artificial intelligence decision-making system comprising, for each source of the one or more sources, a first rating classifying the quality of the source of the one or more sources;
loading, by the one or more processors, the outputs into a blockchain;
obtaining, by the one or more processors, rules, wherein the rules define one or more values for the first rating;
designating, by the one or more processors, via the blockchain, based on the rules, the portion of the one or more sources, wherein the portion of the one or more sources comprises sources of the one or more sources classified with the one or more values for the first rating; and
providing, by the one or more processors, as the training data for the first artificial intelligence decision-making system, the portion of the one or more sources.

2. The computer-implemented method of claim 1, wherein the outputs further comprise a second rating classifying the non-objective influence of each source of the one or more sources, wherein the rules define one or more values for the second rating, and wherein the portion comprises sources of the one or more sources classified with the one or more values for the second rating.

3. The computer-implemented method of claim 1, wherein ingesting the metadata is concurrent with ingesting the data.

4. The computer-implemented method of claim 1, wherein designating the portion comprises generating a knowledge base comprising the portion, wherein the knowledge base comprises the training data.

5. The computer implemented method of claim 1, further comprising:
obtaining, by the one or more processors, new rules, wherein the new rules define a second one or more values for the first rating, wherein the second one or more values for the first rating differ from the one or more values for the first rating; and
re-designating, by the one or more processors, via the blockchain, based on the rules, the portion of the one or more sources, wherein the portion comprises sources of the one or more sources classified with the second one or more values for the first rating.

6. The computer-implemented method of claim 1, wherein the information is selected from the group consisting of: social media feeds, news items, and government announcements.

7. The computer-implemented method of claim 6, wherein classifying the quality and the non-objective influence of each source of the one or more sources comprises performing natural language processing on the information.

8. The computer-implemented method of claim 1, wherein ingesting the data comprises logging the data in the blockchain.

9. The computer-implemented method of claim 1, further comprising:
logging, by the one or more processors, identifiers for sources comprising the portion in the blockchain.

10. A computer program product comprising:
a computer readable storage medium readable by one or more processors and storing instructions for execution by the one or more processors for performing a method comprising:
obtaining, by the one or more processors, data from one or more sources, wherein a portion of the one or more sources comprises training data for a first artificial intelligence decision-making system;
extracting, by the one or more processors, metadata corresponding to the data from the data;
ingesting, by the one or more processors, data from each source of the one or more sources into a corpus;
ingesting, by the one or more processors, the metadata corresponding to the data, into a volume accessible to a second artificial intelligence decision-making system, wherein the second artificial intelligence decision-making system identifies from the one or more sources the portion of the one or more sources to utilize as the training data to train the first artificial intelligence decision-making system, wherein the ingesting comprises:
identifying, by the one or more processors, initial attributes from the metadata;
generating, by the one or more processors, an array of initial values from the initial attributes;
providing, by the one or more processors, the array to a neural network; and
based on the providing, obtaining, by the one or more processors, from the neural network, as output, updated values comprising predicted attributes and the initial attributes;
searching, by the one or more processors, one or more publicly available sources and obtaining, based on the searching, information describing quality and non-objective influence of the data from each source of the one or more sources;

providing, by the one or more processors, as inputs to the second artificial intelligence decision-making system, the information and the updated values of the metadata, to classify the quality and the non-objective influence of each source of the one or more sources;

obtaining, by the one or more processors, outputs from the second artificial intelligence decision-making system comprising, for each source of the one or more sources, a first rating classifying the quality of the source of the one or more sources;

loading, by the one or more processors, the outputs into a blockchain;

obtaining, by the one or more processors, rules, wherein the rules define one or more values for the first rating;

designating, by the one or more processors, via the blockchain, based on the rules, the portion of the one or more sources, wherein the portion of the one or more sources comprises sources of the one or more sources classified with the one or more values for the first rating; and providing, by the one or more processors, as the training data for the first artificial intelligence decision-making system, the portion of the one or more sources.

11. The computer program product of claim 10, wherein the outputs further comprise a second rating classifying the non-objective influence of each source of the one or more sources, wherein the rules define one or more values for the second rating, and wherein the portion comprises sources of the one or more sources classified with the one or more values for the second rating.

12. The computer program product of claim 10, wherein ingesting the metadata is concurrent with ingesting the data.

13. The computer program product of claim 10, wherein designating the portion comprises generating a knowledge base comprising the portion, wherein the knowledge base comprises the training data.

14. The computer program product of claim 10, further comprising:
obtaining, by the one or more processors, new rules, wherein the new rules define a second one or more values for the first rating, wherein the second one or more values for the first rating differ from the one or more values for the first rating; and
re-designating, by the one or more processors, via the blockchain, based on the rules, the portion of the one or more sources, wherein the portion comprises sources of the one or more sources classified with the second one or more values for the first rating.

15. The computer program product of claim 10, wherein classifying the quality and the non-objective influence of each source of the one or more sources comprises performing natural language processing on the information.

16. The computer program product of claim 10, wherein ingesting the data comprises logging the data in the blockchain.

17. A system comprising:
a memory;
one or more processors in communication with the memory;
program instructions executable by the one or more processors via the memory to perform a method, the method comprising:

obtaining, by the one or more processors, data from one or more sources, wherein a portion of the one or more sources comprises training data for a first artificial intelligence decision-making system;

extracting, by the one or more processors, metadata corresponding to the data from the data;

ingesting, by the one or more processors, data from each source of the one or more sources into a corpus;

ingesting, by the one or more processors, the metadata corresponding to the data, into a volume accessible to a second artificial intelligence decision-making system, wherein the second artificial intelligence decision-making system identifies from the one or more sources the portion of the one or more sources to utilize as the training data to train the first artificial intelligence decision-making system, wherein the ingesting comprises:
identifying, by the one or more processors, initial attributes from the metadata;
generating, by the one or more processors, an array of initial values from the initial attributes;
providing, by the one or more processors, the array to a neural network; and
based on the providing, obtaining, by the one or more processors, from the neural network, as output, updated values comprising predicted attributes and the initial attributes;

searching, by the one or more processors, one or more publicly available sources and obtaining, based on the searching, information describing quality and non-objective influence of the data from each source of the one or more sources;

providing, by the one or more processors, as inputs to the second artificial intelligence decision-making system, the information and the updated values of the metadata, to classify the quality and the non-objective influence of each source of the one or more sources;

obtaining, by the one or more processors, outputs from the second artificial intelligence decision-making system comprising, for each source of the one or more sources, a first rating classifying the quality of the source of the one or more sources;

loading, by the one or more processors, the outputs into a blockchain;

obtaining, by the one or more processors, rules, wherein the rules define one or more values for the first rating;

designating, by the one or more processors, via the blockchain, based on the rules, the portion of the one or more sources, wherein the portion of the one or more sources comprises sources of the one or more sources classified with the one or more values for the first rating; and providing, by the one or more processors, as the training data for the first artificial intelligence decision-making system, the portion of the one or more sources.

18. The computer-implemented method of claim 1, wherein the obtaining the data and the extracting the metadata are performed concurrently by the one or more processors.

19. The computer-implemented method of claim 1, wherein the non-objective influence is selected from the group consisting of: a regional perspective, a national perspective, a science community perspective, a non-expert perspective, an expert perspective, an industry, advocacy associated with a perspective, and a group associated with a perspective.

\* \* \* \* \*